United States Patent
M. N. et al.

(10) Patent No.: US 7,165,225 B2
(45) Date of Patent: Jan. 16, 2007

(54) CURSOR TRACKING IN A MULTI-LEVEL GUI

(75) Inventors: Kishore M. N., Hyderabad (IN); Nikhil Jain, Delhi (IN); Debi Mishra, Redmond, WA (US); John Samuel Azariah, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 09/931,389

(22) Filed: Aug. 15, 2001

(65) Prior Publication Data
US 2003/0041099 A1 Feb. 27, 2003

(51) Int. Cl.
*G06F 3/00* (2006.01)
(52) U.S. Cl. .................................................. 715/764
(58) Field of Classification Search ........ 715/856–862, 715/840, 835, 821–823, 764
See application file for complete search history.

(56) References Cited

U.S. PATENT DOCUMENTS

| | | | | |
|---|---|---|---|---|
| 5,307,451 A | * | 4/1994 | Clark | 345/427 |
| 5,687,331 A | * | 11/1997 | Volk et al. | 715/840 |
| 5,737,554 A | * | 4/1998 | Epelman-Wang et al. | 715/862 |
| 5,764,215 A | * | 6/1998 | Brown et al. | 345/620 |
| 5,838,315 A | * | 11/1998 | Craycroft et al. | 715/866 |
| 6,005,570 A | * | 12/1999 | Gayraud et al. | 715/709 |
| 6,049,325 A | * | 4/2000 | Alexander | 345/157 |
| 6,229,525 B1 | * | 5/2001 | Alexander | 345/157 |
| 2003/0041070 A1 | * | 2/2003 | Thompson et al. | 707/103 R |

OTHER PUBLICATIONS

Laura Lemay, Web Publishing with HTML 4 in a Week, 1997, sams net, fourth edition, pp. 335-362 and 399-414.*

* cited by examiner

*Primary Examiner*—Kristine Kincaid
*Assistant Examiner*—Lê Nguyen
(74) *Attorney, Agent, or Firm*—Lee & Hayes, PLLC

(57) ABSTRACT

Methods and systems for cursor tracking in a multilevel GUI hierarchy.

18 Claims, 8 Drawing Sheets

CURSOR TRACKING IN A MULTI-LEVEL GUI

TECHNICAL FIELD

This invention relates generally to methods and/or devices for curosr tracking.

BACKGROUND

Many computer applications use a graphical user interface (GUI). A user typically navigates a GUI through a cursor tracking system. To enable any particular GUI component, a user often employs a device, such as, a mouse, track ball, arrow keys, a touch screen, voice recognition, etc., first, to position the cursor on a component and then, to select an operation related to that component. For example, a GUI may include an "OK" button as a component that initiates some action. To enable the button's action, a user employs a mouse, or other suitable device, first, to position a cursor on, or near, the "OK" button and then, to select the button's corresponding operation by waiting, hitting return, clicking a mouse button, etc. Of course, in some instances, positioning and selection may be achieved simultaneously, e.g., a touch screen. For any of these processes to work, at some point in time, the GUI's underlying software, or a computer's operating system, must link the cursor with the desired component.

A commonly used process for linking a cursor with a component involves hit testing. In a typical hit testing process, each GUI component has an associated area. To link a cursor with a component, a program determines which component's (or components') area encompasses the cursor position. If only one component's area encompasses the cursor position, then the cursor is linked to that component.

Hit testing often relies on resources provided by an operating system, such as the WINDOWS® operating system (Microsoft Corporation, Redmond, Wash.). Consequently, as the number of GUI components increases, so does the reliance on such resources. The problem has become particularly acute with the advent of GUI frameworks, such as the .NET™ framework (Microsoft Corporation, Redmond, Wash.), which cater to an increasing need for a richer working set of components for usable applications. Thus, a need exists for new hit testing and/or other procedures that operate in a more efficient manner and/or lessen the demand placed on an operating system and/or a framework.

SUMMARY

Methods and systems for cursor tracking in multilevel GUI hierarchies. Additional features and advantages of the invention will be made apparent from the following detailed description of illustrative embodiments, which proceeds with reference to the accompanying figures.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Figure 1:
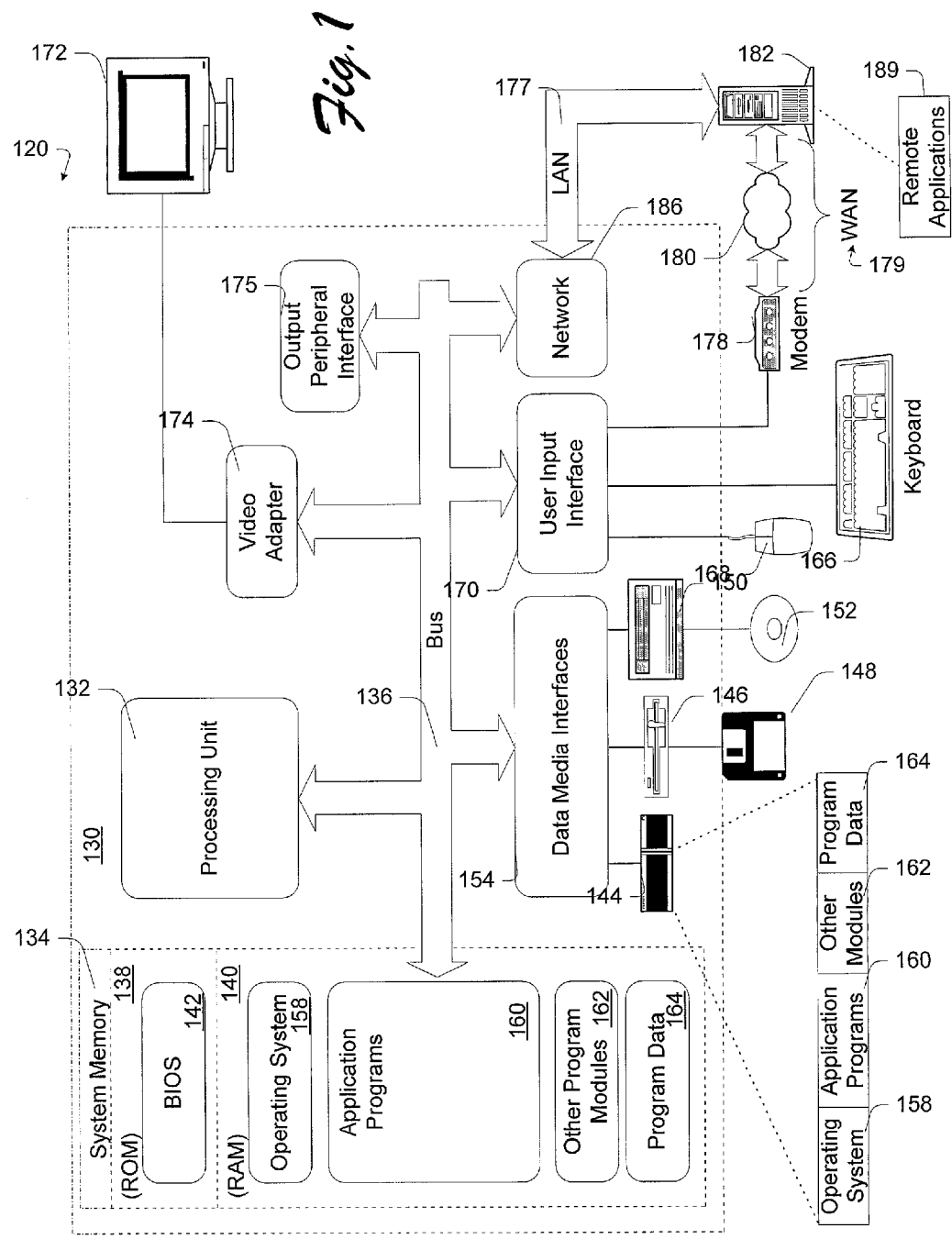
FIG. 1 is a block diagram generally illustrating an exemplary computer system on which the exemplary methods and exemplary systems described herein may be implemented.

Turning to the drawings, wherein like reference numerals refer to like elements, various methods and converters are illustrated as being implemented in a suitable computing environment. Although not required, the methods and converters will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the methods and converters may be practiced with other computer system configurations, including hand-held devices, multi-processor systems, microprocessor based or programmable consumer electronics, network PCs, minicomputers, mainframe computers, and the like. The methods and converters may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and converter arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

GUI Items and Parent-Child Hierarchy

The WINDOWS® operating system, as well as other systems or frameworks providing graphical user interfaces, maintains a hierarchy of GUI items, such as containers and/or components, in at least one "z-order", which is optionally branched. In an exemplary z-order, a component, or "child", is logically (and typically visually) contained within a container, or "parent". In some instances, a user may reposition a child to access other children and/or other areas of a parent, which may or may not affect the z-order. Further, a user may reposition a parent to access other parents and/or other children, which may or may not affect the z-order. In most systems, the z-order does not change with respect to repositioning of items, e.g., parents and/or children.

Figure 2:
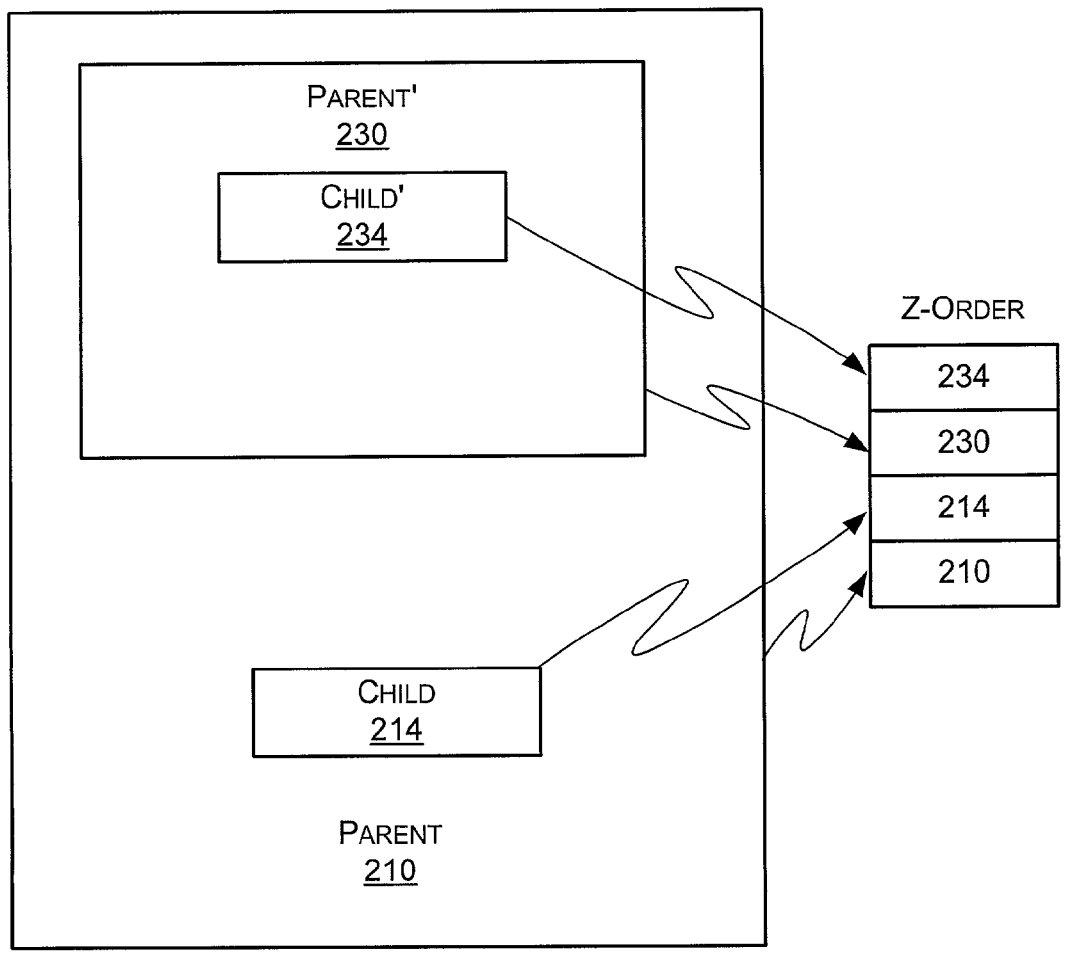
FIG. 2 is a block diagram illustrating an exemplary GUI hierarchy and a corresponding z-order.

FIG. 2 shows illustrates an exemplary hierarchy of GUI parents 210, 230 and children 214, 234. The z-order, as shown in Table 1 and FIG. 2, represents a hierarchy of the parents 210, 230 and children 214, 234:

TABLE 1

| Z-order | |
|---|---|
| Child' | 234 |
| Parent' | 230 |
| Child | 214 |
| Parent | 210 |

This particular hierarchy may exist in an operating system and/or a framework. For example, Parent 210 and Child 214 may exist in an operating system and Parent' 230 and Child'

234 in a framework. The z-order may also represent a display order wherein Child' 234 is at the highest level and always displayed whereas Parent 210 is at the lowest level and may be completely occluded by resizing Parent' 230 such that the display area of Parent' 230 becomes larger than that of Parent 210. In addition, whether or not Parent 210 fills the entire display area, Parent 210 may optionally function as a root. A root is generally under direct control of an operating system; however, the term "root" may also apply to a base GUI container or parent of a framework.

In a typical cursor tracking system, a user positions the cursor in a display area. Next, the system links the cursor to a GUI item (e.g., container/parent or component/child) usually through a hit testing process, as described in the Background section. For example, consider a cursor positioned within the Child 214 shown in FIG. 2. A typical hit testing process may determine the proper link by "querying" each item (e.g., parent or child) in the hierarchy as to ownership. Again, this process places a demand on an operating system's and/or a framework's resources.

Root Level Grid-based Cursor Tracking

Figure 3:
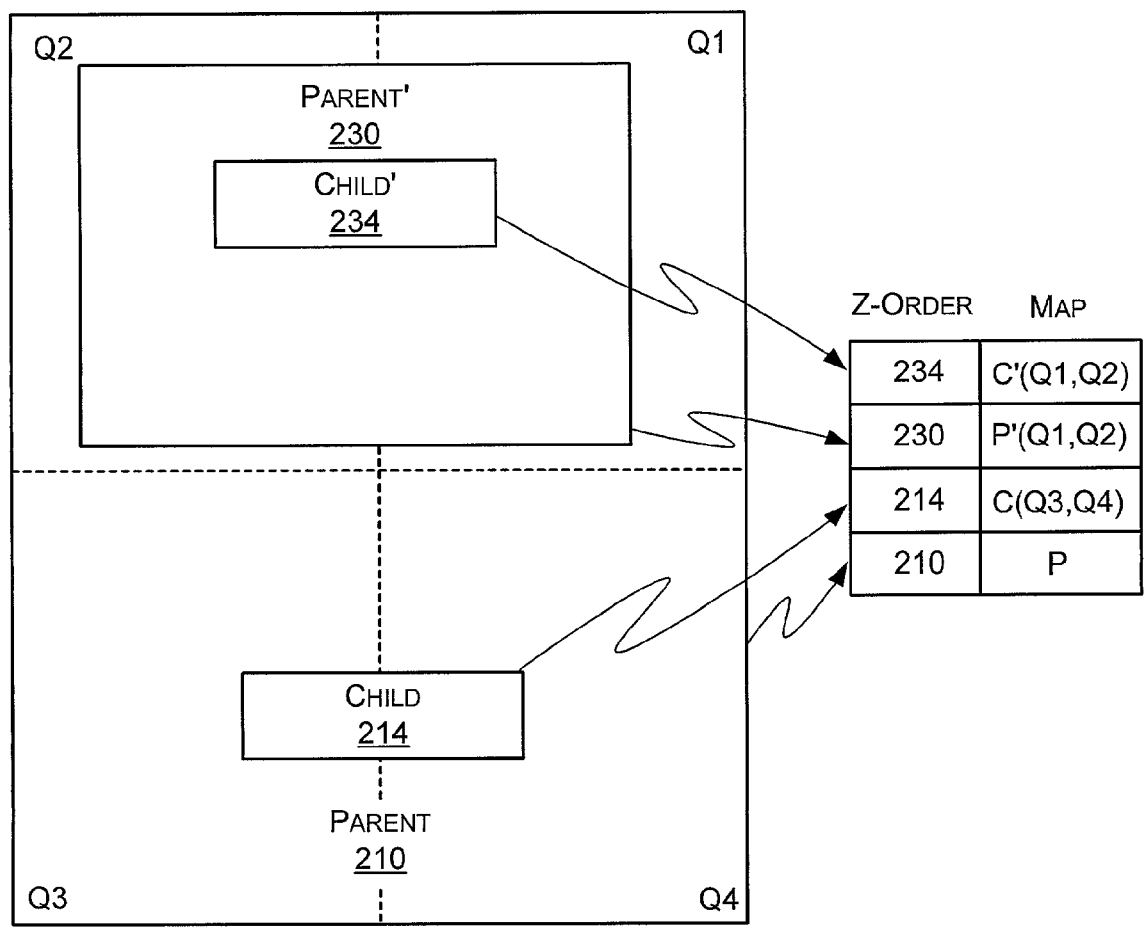
FIG. 3 is a block diagram illustrating the exemplary GUI hierarchy of FIG. 2 further including a grid and a map.

An exemplary cursor tracking system includes a root level grid. FIG. 3 illustrates a GUI having parents 210, 230 and children 214, 234 wherein one parent 210 includes a root level grid. In this exemplary system, a parent 210 acts as a root and includes a root level M×N dimensioned grid, wherein M equals 2 and N equals 2. Note that M and N need not be equal. The 2×2 grid divides the parent 210 into sectors, e.g., quadrants, labeled Q1, Q2, Q3, and Q4 in FIG. 3. This exemplary system then creates a map relating quadrants Q1, Q2, Q3, and Q4 to other parents and/or children. For example, for the arrangement of parents (P 210, P' 230) and children (C 214, C' 234) shown in FIG. 3, the map of Table 2 results:

TABLE 2

Map

C'(Q1, Q2)
P'(Q1, Q2)
C(Q3, Q4)
P

An exemplary method that uses this map determines the quadrant in which the cursor lies and determines which parents and/or children have a map entry including that quadrant. For example, consider a cursor positioned in Q1 of Parent 210. A quick examination of the map of Table 2 (also shown in FIG. 3) indicates that only Parent' 230 and Child' 234 include a reference to Q1. Therefore, rather than querying every parent and child, the exemplary system needs to query only those parents and/or children having a reference to Q1. In the foregoing example, use of the exemplary method reduces the number of possible items having the cursor by one-half (only two of the four entries have a reference to Q1). Of course, an initial query, or queries, may be required to determine where a cursor resides; however, a root level program or coordinate system may be used to eliminate the need for such a query or queries. For example, the origin of parent 210 may lie at the intersection of the two grid lines thereby inherently dividing the parent into +/+, +/−, −/+, and −/− quadrants. Alternatively, a radial system may be used, e.g., 90°, 180°, 270°, and 360°, for quadrants or other sectors. In yet another alternative, the origin lies at a corner or other boundary point from which the system can determine sectors, whether quadrants or otherwise. In general, coordinates are initially set during grid generation and optionally account for GUI item resizing and/or repositioning. In an exemplary system having a positionable "root" parent, the root level program and/or coordinate system adjust to repositioning of the parent.

Referring again to FIG. 3, once an exemplary method determines the sector in which the cursor resides, a query may proceed in conjunction with a z-order and/or any other type of order (even by z-order segments or other criteria). However, a query starting at the highest z-order will typically prove to be most efficient.

The exemplary methods and systems described with reference to FIG. 3, and equivalents thereof, optionally include a root level parent wherein other parents and/or children are "boxed" within some defined boundary related to, or of, the root level parent. In such a system, there is no chance of "losing" a GUI item contained in the root level parent.

Container Level Grid-based Cursor Tracking

Figure 4:
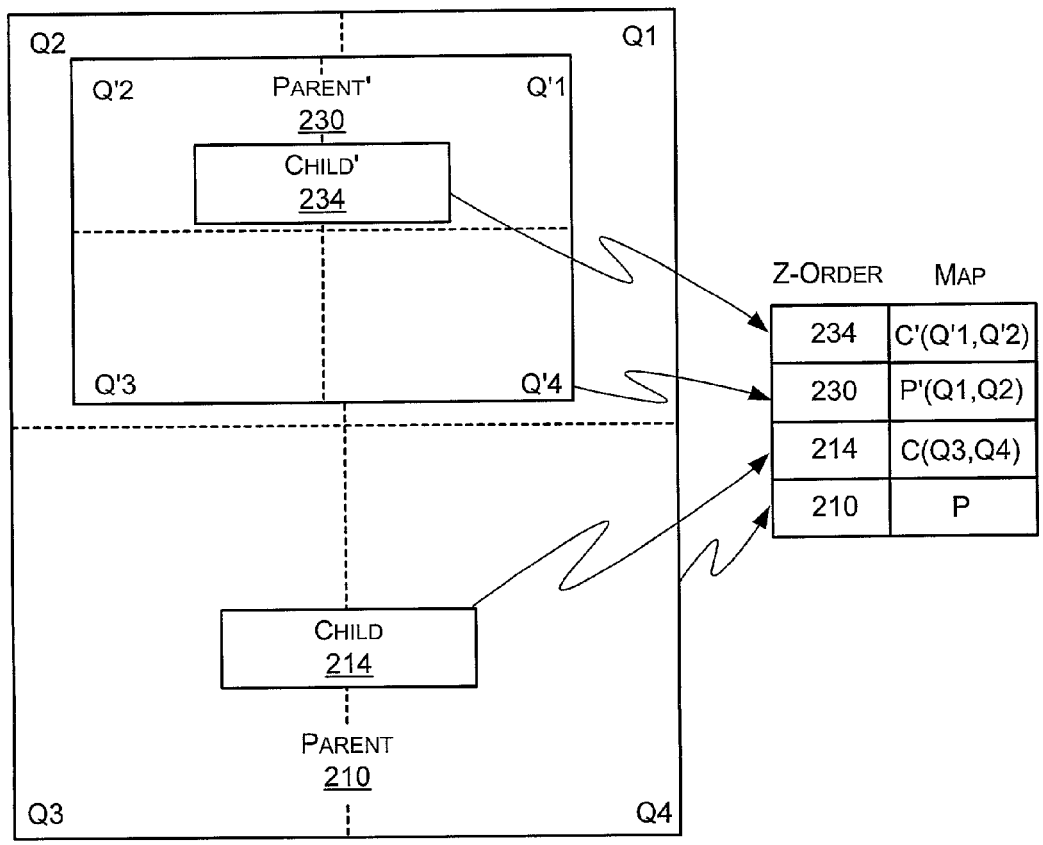
FIG. 4 is a block diagram illustrating the exemplary GUI hierarchy of FIG. 3 further including another grid.

Referring to FIG. 4, the exemplary hierarchy of FIG. 3 is shown; however, Parent' 230 now includes a M'×N' grid, wherein M' equals 2 and N' equals 2. Note that M' need not necessarily equal N' nor M equal M' nor N equal N'. In such an exemplary hierarchy, grids are included at the parent (e.g., container) level, optionally for every GUI item that functions as a parent.

As shown in FIG. 4, Parent' 230 includes a vertical division and a horizontal division that cross at the approximate center of Parent' 230 thus dividing Parent' 230 into quadrants Q'1, Q'2, Q'3 and Q'4. A map corresponding to this hierarchy appears in FIG. 4 and in Table 3 below.

TABLE 3

Map

C'(Q'1, Q'2)
P'(Q1, Q2)
C(Q3, Q4)
P

An exemplary method that uses this map determines the quadrant in which the cursor lies and determines which parents and/or children have a map including that quadrant. For example, consider a cursor positioned in Q1 of Parent 210. A quick examination of the map of Table 3 (also shown in FIG. 4) indicates that only Parent' 230 includes a reference to Q1. Therefore, rather than querying every parent and child, the exemplary system needs to query only those parents and/or children having a reference to Q1. Thus, the exemplary method queries Parent' 230. In turn, Parent' 230 includes quadrants, and as described above, a program and/or a coordinate system that optionally aids in locating the sector (e.g., quadrant) in which the cursor lies. If the cursor lies in Q'4, then the cursor links to Parent' 230 because the map has no entries that include Q'4. However, if the cursor lies in Q'1, then the method, per the map, queries Child' 234. If Child' 234 responds affirmatively, then the cursor links to Child' 234, otherwise, the cursor links to Parent' 230.

Figure 5:
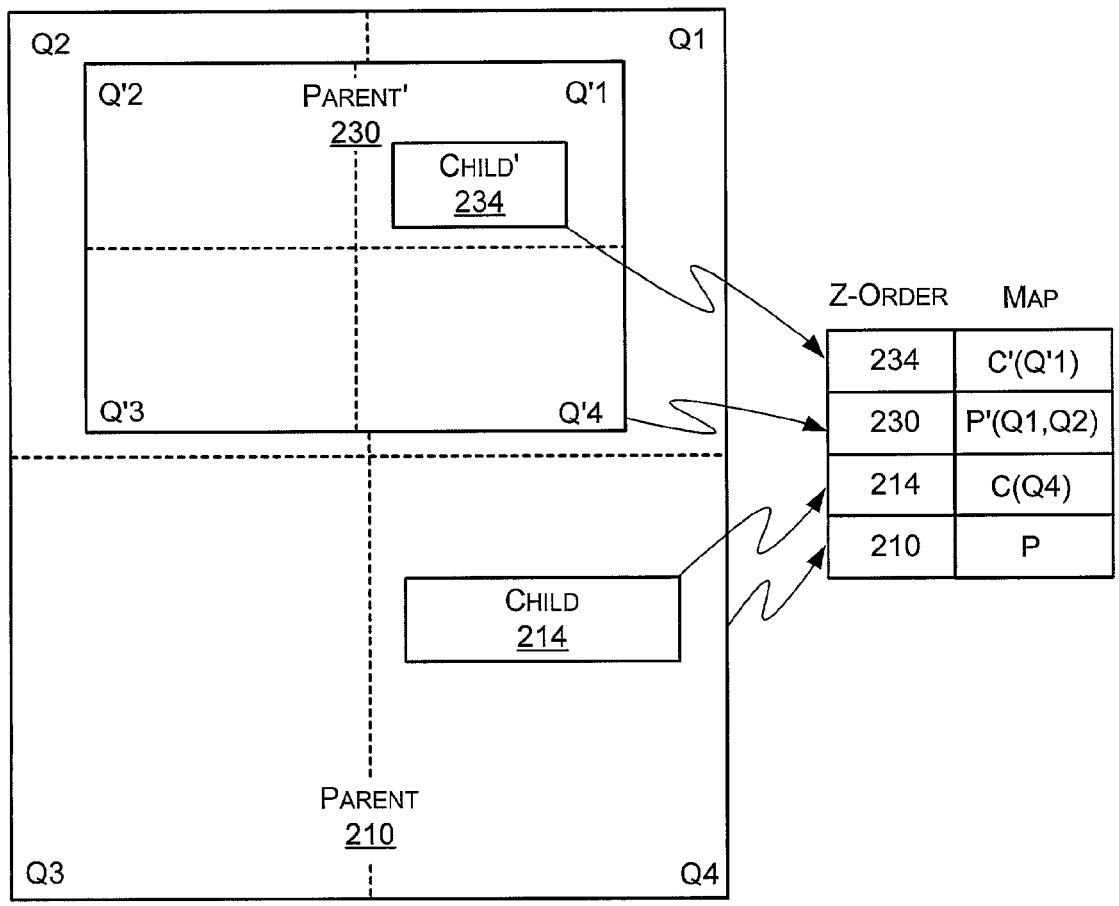
FIG. 5 is a block diagram illustrating the exemplary GUI hierarchy of FIG. 4 having two repositioned children.

A programmer can optimize GUI applications with an a priori knowledge of an exemplary grid method. For example, a programmer may choose to locate children in relation to sector boundaries (note that in FIGS. 2-5, Parent' 230 is optionally a child of Parent 210). FIG. 5 illustrates an exemplary method of using this strategy. In FIG. 5, Child 214 and Child' 234 are located wholly within a single sector, Q4 and Q'1, respectively. The map corresponding to the hierarchy of FIG. 5 appears in FIG. 5 and in Table 4 below.

TABLE 4

| Map |
|---|
| C'(Q'1) |
| P'(Q1, Q2) |
| C(Q4) |
| P |

In this map, Child 214 has only one possible sector, Q4, whereas, in the map corresponding to FIG. 4, Child 214 had two possible sectors, Q3 and Q4. Likewise, Child' 234 has only one possible sector, Q'1, whereas, in the map corresponding to FIG. 4, Child' 234 had two possible sectors, Q1 and Q2. Thus, an a priori knowledge of such an exemplary grid method allows a programmer to develop more efficient applications. Of course, for any given grid, an "optimization" method may also be implemented to indicate where parents and/or children should be placed for prospective gains in efficiency. Alternatively, a reverse method implements a grid once a programmer has developed a hierarchy. For example, consider a GUI application that includes a calendar wherein each day comprises a child or a parent week, which is optionally a child of a parent month. Such a reverse method would automatically and/or through user input set a grid that aims to improve efficiency of cursor tracking and/or linking operations, e.g., an exemplary grid may box weeks for a parent month and days for a parent week.

In addition, the exemplary hierarchy of FIG. 5, when compared to the exemplary hierarchy shown in FIG. 4, illustrates an optional map updating feature for positionable parents and/or children. In such a scenario, repositioning of a parent and/or a child causes a method to update the corresponding map.

As mentioned above, a parent may operates as a "root" belonging to an operating system and another "parent" may operate as a "root" of a framework application. An exemplary map accounts for such differences. For example, referring to FIG. 4, Parent' 230 may correspond to a framework whereas Parent 210 may correspond to an operating system. In such an example, a map optionally includes an entry for each parent to indicate whether that parent is associated with an operating system (OS) and/or a framework (F), e.g., C(Q3,Q4,OS), P'(Q1,Q2,F), etc.

Figure 6:
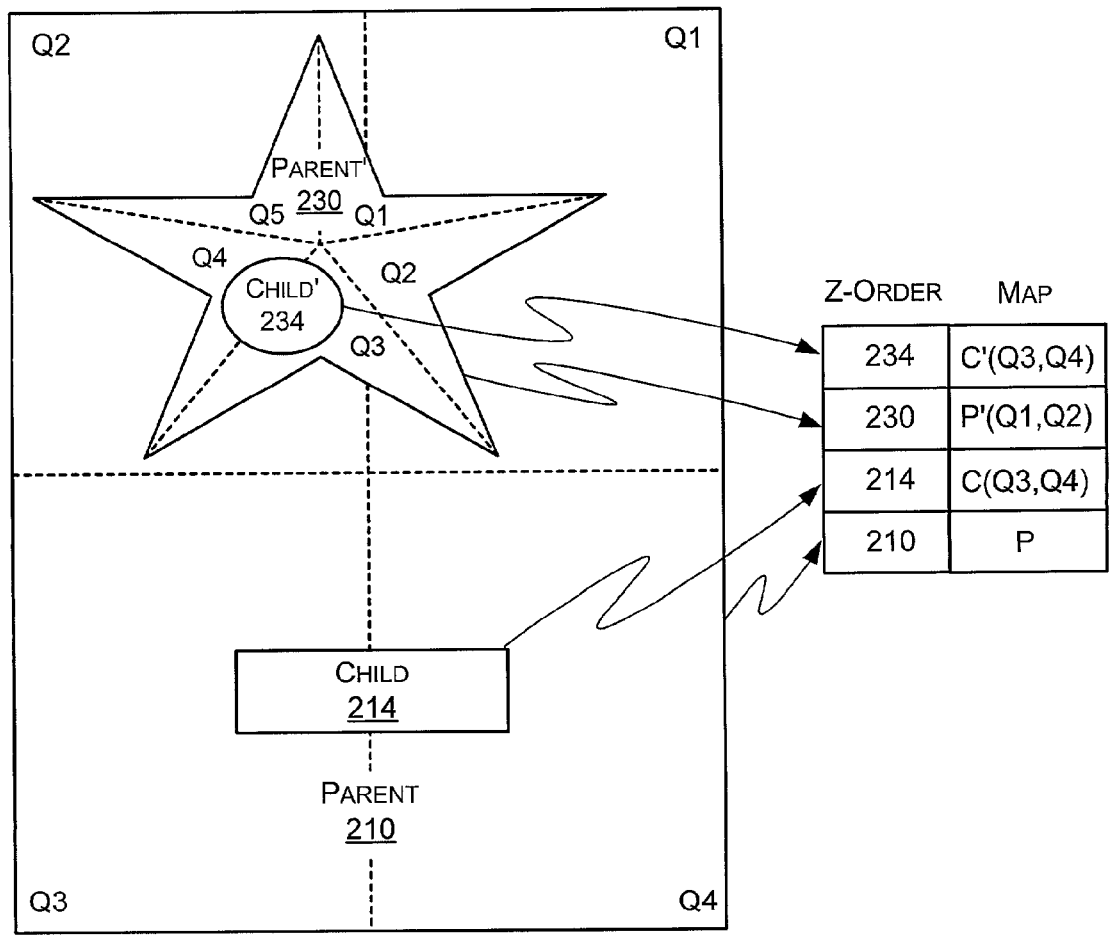
FIG. 6 is a block diagram illustrating the exemplary GUI hierarchy of FIG. 3 having an arbitrary shaped parent and an arbitrary shaped child.

While FIGS. 2–5 illustrate parents and children having rectangular boundaries, FIG. 6 illustrates an arbitrary star-shaped parent 230 and an arbitrary ellipsoid-shaped child 234. FIG. 6 also shows a corresponding hierarchy map. The exemplary methods presented herein are suitable for any shape GUI item. In addition, the method can apply to a parent and/or child having discontinuities. For example, a child may include two visible parts, one resident in one sector of a parent and the other resident in another sector of a parent. An exemplary method including a map provides an approach for relating the two separate parts. Of course, the map, once established, may be used for a plethora of other criteria germane to a GUI application.

Figure 7:
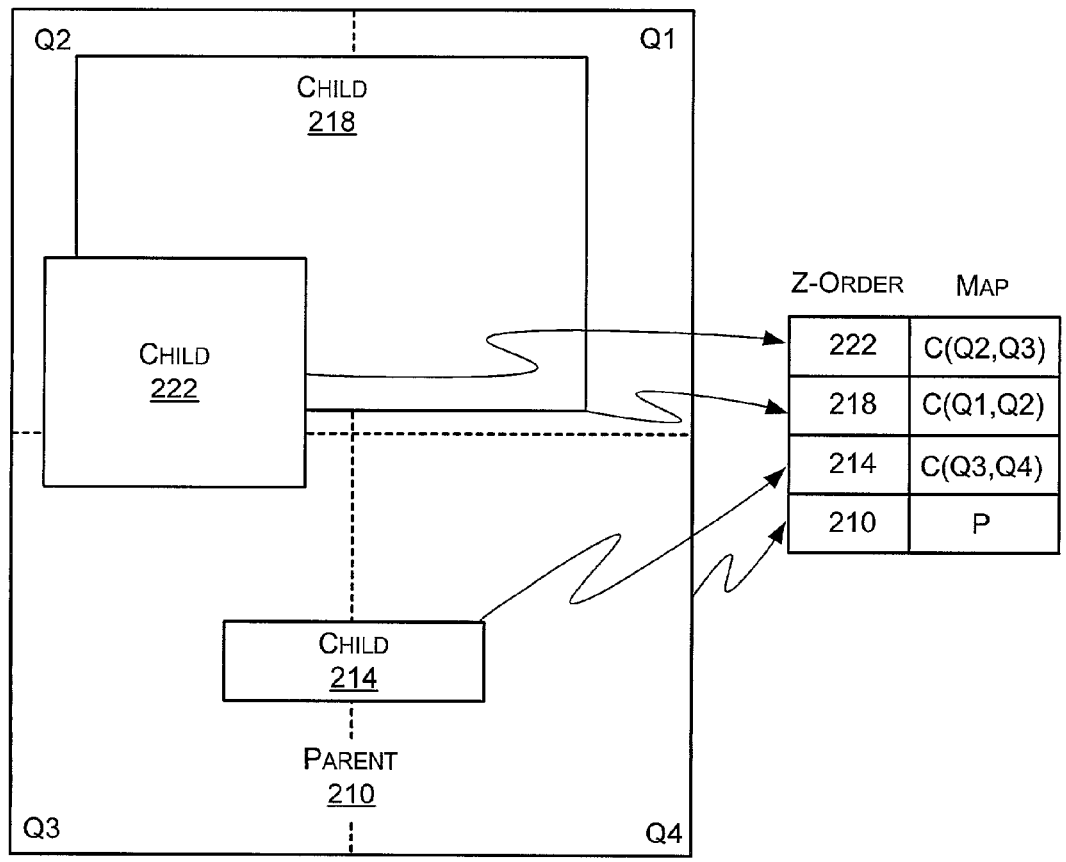
FIG. 7 is a block diagram illustrating an exemplary GUI hierarchy having an overlapping child.

FIG. 7 illustrates yet another possible hierarchy wherein a single parent 210 (root or otherwise) includes three children 214, 218, 222. Note that Child 222 overlaps and occludes Child 218. In addition, Child 222 has a higher position in the z-order. Thus, for a cursor positioned in sector Q2 of Parent 210, an exemplary method would first query Child 222 rather than Child 218. An exemplary method may also account for disabled parents and/or children.

Figure 8:
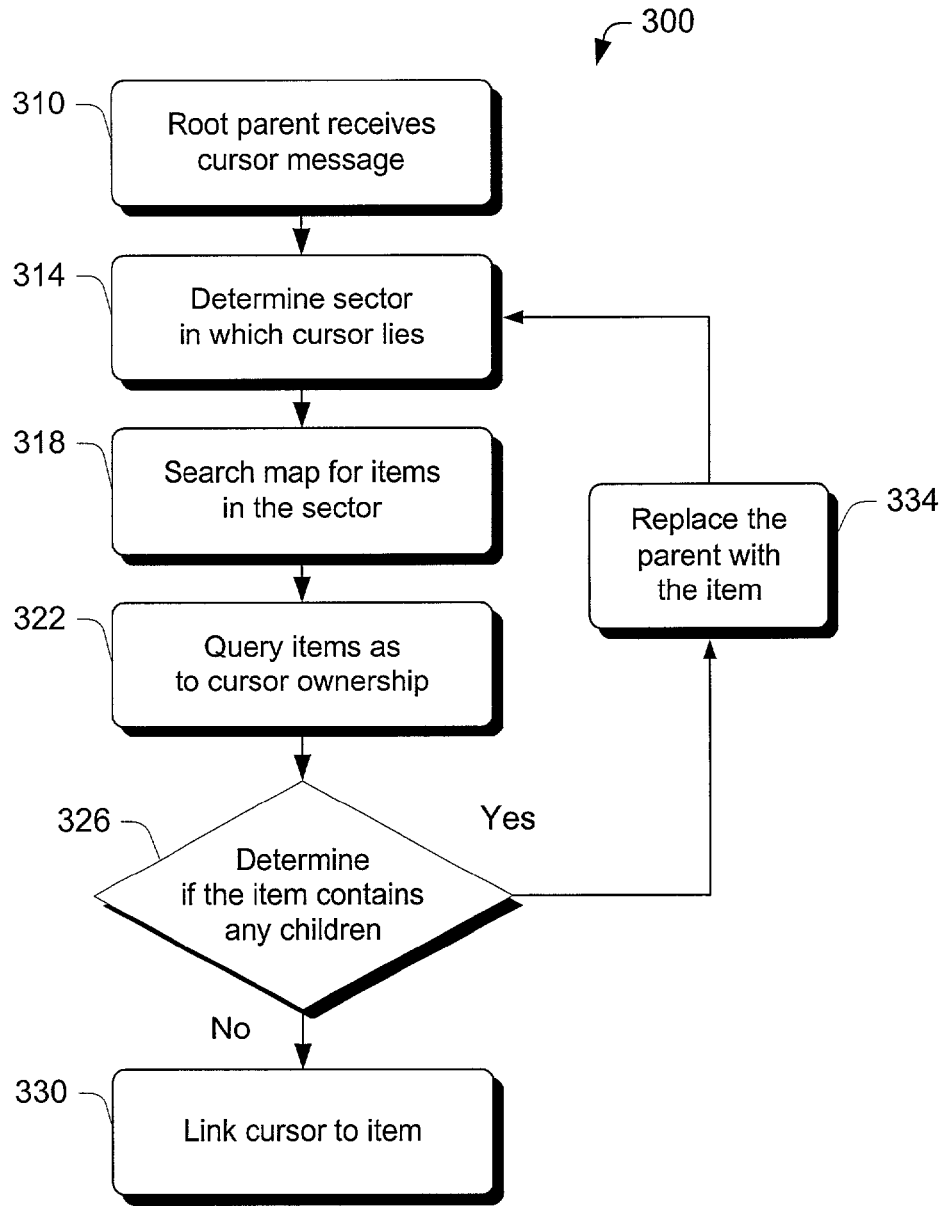
FIG. 8 is a block diagram illustrating an exemplary method for hit testing.

A block diagram appears in FIG. 8 that illustrates an exemplary hit testing method 300 suitable for a multiple grid method (e.g., container or parent level grids). In a message block 310, a root parent receives a message regarding a cursor that is positioned within its bounds. A determination block 314 determines the parent sector in which the cursor lies. Once the method ascertains the sector, a search block 318 searches the hierarchy map for all items associated with that particular sector. A query block 322 then queries the associated items to ascertain cursor "ownership".

According to the exemplary method, a determination block 326 determines whether the item contains any children. If the item contains no children then a link block 330 links the cursor to the item. However, if the item contains at least one child, then it is a parent and a replacement block 334 replaces the root (or former GUI item) with the parent. The exemplary method continues at determination block 314 and proceeds until a link to an item occurs.

Exemplary Grid Method Trials

Trials were performed using exemplary methods for hit testing on two GUI hierarchies. One GUI hierarchy included a calendar having approximately 500 items with a 5 level deep parent-child hierarchy and a second GUI hierarchy included a panel with approximately 20 items with a 2 level deep parent-child hierarchy. In both the first and second GUI hierarchies, M was equal to 16 and N was equal to 16 for the root level grid. For trials with container level grids, M was equal to 2 and N was equal to 2. A computer display having a pixel area of approximately 1024 pixels by 768 pixels was used.

Trials involved 1000 cursor placements using two exemplary methods. One method included only a root level grid while the other method included container (e.g., parent including child-parent') level grids. Results are shown in Table 5 and Table 6 below.

TABLE 5

Time taken to execute 1000 cursor placements.

| | Calendar sample | Panel sample |
|---|---|---|
| Root level grid | 21 ms | 5 ms |
| Container level grid | 13 ms | 4 ms |

TABLE 6

Memory overhead (number of objects stored).

| | Calendar | Panel sample |
|---|---|---|
| Root level grid | 2283 | 796 |
| Container level grid | 878 | 76 |

As indicated by the results shown in Tables 5 and 6, the container level grid method exhibited efficiency gains for both the calendar GUI hierarchy and the panel GUI hierarchy. These efficiency gains include gains in both time and memory.

The exemplary methods are also optionally suitable for use in applications that require, for example, invalidating regions from a point and/or finding an area to fill given a point by varying semantics that need to be applied. For example, consider a gaming application where a missile can hit a variety of targets (e.g., children or components), and upon hitting a target, an area associated with, or of, the hit target requires repainting. Given the coordinates or other information regarding a missile, an exemplary method determines which, if any, target lies at a missile end location, or along a missile trajectory and further initiates action for painting. In this example, the determining optionally includes linking a cursor to a target using a map.

Thus, although some exemplary methods and exemplary systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A method comprising:
   dividing a GUI parent, having a GUI child, into cursor linking sectors;
   mapping the GUI child to at least one of the cursor linking sectors; and
   linking a cursor to the GUI child using the mapping.

2. A method comprising:
   dividing a GUI parent, having GUI children, into cursor linking sectors;
   mapping each of the GUI children to at least one of the cursor linking sectors; and
   linking a cursor to one of the GUI children using the mapping.

3. A method comprising:
   dividing GUI parents into cursor linking sectors;
   mapping a GUI child of a GUI parent to at least one of the cursor linking sectors; and
   linking a cursor to a GUI child using the mapping.

4. A method comprising:
   generating GUI items comprising at least one GUI parent having at least one GUI child;
   dividing each GUI parent into cursor linking sectors;
   mapping each GUI child to at least one of the cursor linking sectors; and
   linking a cursor to a GUI child using the mapping.

5. A method for tracking a cursor in a GUI framework application comprising:
   generating GUI items comprising at least one GUI parent having at least one GUI child;
   dividing each GUI parent into cursor linking sectors;
   mapping each GUI child to at least one of the cursor linking sectors; and
   linking a cursor to a GUI child using the mapping.

6. A computer-readable medium storing computer-executable instructions to divide GUI items into cursor linking sectors; to create a map of the GUI items in relation to the sectors; and to link a cursor to a GUI item using the map.

7. A method comprising:
   receiving a GUI comprising a GUI parent having GUI children, the GUI children having positions within the GUI parent; and
   dividing the GUI parent into container level, linking sectors based on the positions of the GUI children within the GUI parent wherein the linking sectors provide for linking to the GUI parent and/or the GUI children.

8. The method of claim 7 wherein each sector includes at least one of the GUI children.

9. The method of claim 7 further comprising mapping each of the GUI children to at least one of the sectors.

10. The method of claim 7 further comprising linking a cursor to one of the GUI children using the mapping.

11. A computer-readable medium storing computer-executable instructions to receive a GUI comprising a GUI parent having GUI children, the GUI children having positions within the GUI parent, and to divide the GUI parent into container level, linking sectors based on the positions of the GUI children within the GUI parent wherein the linking sectors provide for linking to the GUI parent and/or the GUI children.

12. A method comprising:
   dividing a GUI parent associated with an operating system into operating system sectors; and
   dividing a GUI parent associated with a framework into frameworks, linking sectors.

13. The method of claim 12 wherein the GUI parent associated with a framework comprises GUI children.

14. The method of claim 13 further comprising mapping each of the GUI children to at least one of the framework, linking sectors.

15. The method of claim 14 further comprising linking a cursor to one of the GUI children using the mapping.

16. The method of claim 12 further comprising creating a map that maps operating system sectors to the operating system and maps framework, linking sectors to the framework.

17. The method of claim 16 wherein the map includes information related to GUI children.

18. A method comprising:
   dividing a GUI parent, having GUI children, into linking sectors;
   mapping each of the GUI children to at least one of the sectors;
   linking a cursor to one of the GUI children using the mapping; and
   painting one of the GUI children based on the linking.

* * * * *